United States Patent
Buis et al.

(10) Patent No.: US 8,589,054 B2
(45) Date of Patent: Nov. 19, 2013

(54) SYSTEM AND METHOD FOR CONTROLLING THE FRESH AIR AND BURNT GASES INTRODUCED INTO AN INTERNAL COMBUSTION ENGINE DURING TRANSITIONS BETWEEN THE PURGING OF A NITROGEN OXIDES TRAP AND THE REGENERATION OF A PARTICULATE FILTER

(75) Inventors: Emmanuel Buis, Sceaux (FR); Yohann Petillon, Montigny le Bretonneux (FR)

(73) Assignee: Renault S.A.S., Boulogne Billancourt (FR)

( * ) Notice: Subject to any disclaimer, the term of this patent is extended or adjusted under 35 U.S.C. 154(b) by 403 days.

(21) Appl. No.: 12/936,276

(22) PCT Filed: Apr. 1, 2009

(86) PCT No.: PCT/FR2009/050558
§ 371 (c)(1),
(2), (4) Date: Jan. 21, 2011

(87) PCT Pub. No.: WO2009/136028
PCT Pub. Date: Nov. 12, 2009

(65) Prior Publication Data
US 2011/0112745 A1    May 12, 2011

(30) Foreign Application Priority Data
Apr. 4, 2008   (FR) ..................... 08 52273

(51) Int. Cl.
*B60T 7/12*    (2006.01)
*G05D 1/00*    (2006.01)
*G06F 7/00*    (2006.01)
*G06F 17/00*   (2006.01)

(52) U.S. Cl.
USPC ............... 701/108; 123/568.11; 123/568.21

(58) Field of Classification Search
USPC ........... 123/586.11, 568.16, 568.21, 698; 701/108, 114; 60/285, 311, 605.2
See application file for complete search history.

(56) References Cited

U.S. PATENT DOCUMENTS 5,482,020 A * 1/1996 Shimizu et al. .......... 123/406.47
5,551,408 A * 9/1996 Shimizu et al. ............... 123/679
(Continued)

FOREIGN PATENT DOCUMENTS

EP    0 321 451        6/1989
EP    1006270 A1 *    6/2000
(Continued)

OTHER PUBLICATIONS

International Search Report issued Oct. 1, 2009 in PCT/FR09/50558 filed Apr. 1, 2009.

*Primary Examiner* — Stephen K Cronin
*Assistant Examiner* — Joseph Dallo
(74) *Attorney, Agent, or Firm* — Oblon, Spivak, McClelland, Maier & Neustadt, L.L.P.

(57) ABSTRACT

Method for controlling the power plant of a motor vehicle with partial exhaust gas recirculation in which the fresh air flow rate and the partially recirculated gases flow rate are regulated either on a rich mixture control structure or on a lean mixture control structure and in which the flow rates are set, on the rich mixture control structure, to the setpoint values equal to the flow rate setpoint values of the lean mixture control structure during a transition from a rich mixture control structure to a lean mixture control structure.

12 Claims, 7 Drawing Sheets

(56) References Cited

U.S. PATENT DOCUMENTS

| | | | |
|---|---|---|---|
| 6,842,690 B2 * | 1/2005 | Akao et al. | 701/114 |
| 6,857,421 B2 * | 2/2005 | Adler et al. | 123/681 |
| 6,990,951 B1 * | 1/2006 | Liu et al. | 123/299 |
| 2002/0184877 A1 * | 12/2002 | Ishii et al. | 60/277 |
| 2006/0117738 A1 * | 6/2006 | Cochet et al. | 60/285 |
| 2007/0157604 A1 * | 7/2007 | Kakuya et al. | 60/285 |
| 2008/0028754 A1 * | 2/2008 | Tumati et al. | 60/297 |
| 2008/0196405 A1 | 8/2008 | Buis et al. | |
| 2009/0199824 A1 | 8/2009 | Buis et al. | |
| 2009/0217663 A1 | 9/2009 | Buis et al. | |

FOREIGN PATENT DOCUMENTS

| | | |
|---|---|---|
| FR | 2 886 339 | 12/2006 |
| WO | 2006 095113 | 9/2006 |
| WO | 2006 095114 | 9/2006 |
| WO | 2007 063258 | 6/2007 |

\* cited by examiner

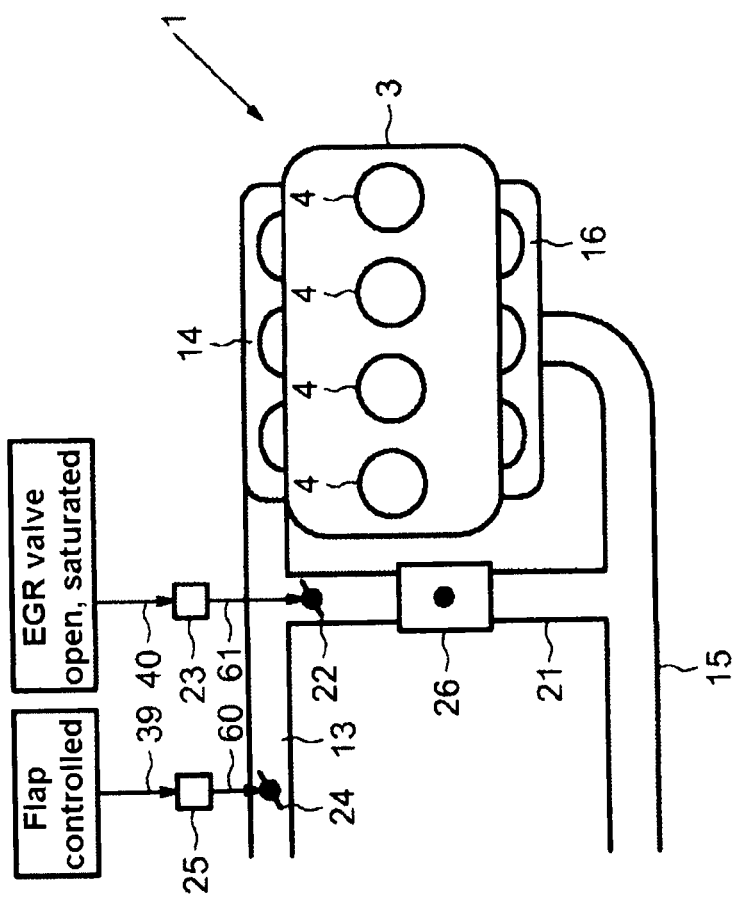

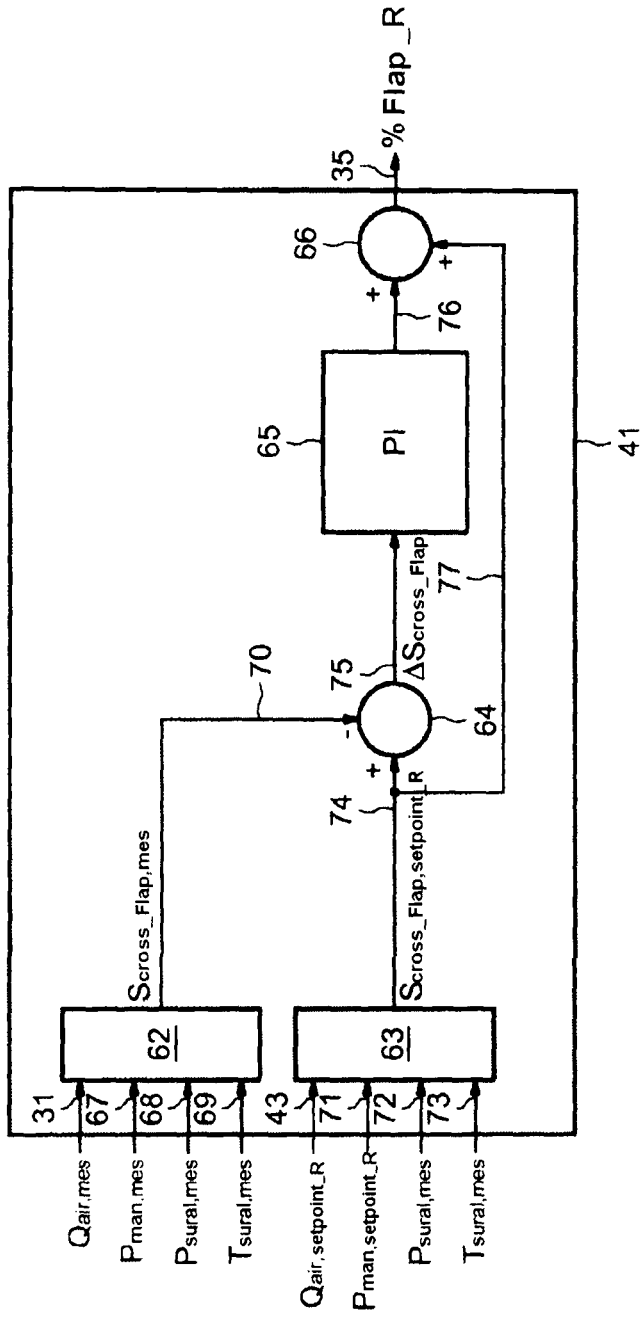

SYSTEM AND METHOD FOR CONTROLLING THE FRESH AIR AND BURNT GASES INTRODUCED INTO AN INTERNAL COMBUSTION ENGINE DURING TRANSITIONS BETWEEN THE PURGING OF A NITROGEN OXIDES TRAP AND THE REGENERATION OF A PARTICULATE FILTER

BACKGROUND

The invention relates to controlling the fresh air and burnt gases introduced into an internal combustion engine during transitions between the purging of a nitrogen oxides trap and the regeneration of a particulate filter.

More especially, the invention relates to engines provided with a loop for the partial recirculation of exhaust gases, also called an "EGR circuit".

Current pollution standards require the implementation of policies that result in a reduction in the emissions of nitrogen oxides (NOx) and particulates. One means of obtaining this objective is the implementation of systems that process exhaust gases, such as a nitrogen oxides trap or a particulate filter, in addition to an EGR circuit. Nevertheless, the use of these processing systems requires maintenance phases carried out under specific conditions of combustion. Indeed, the particulate filter requires the exhaust gases to be at an increased temperature to be regenerated and, more especially, as rapid a rise in temperature as possible. The nitrogen oxides trap must be purged of nitrogen oxides and sulfur oxides (SOx) at a hot temperature and in a reducing environment and this purging also requires as rapid a rise as possible in the temperature of the exhaust gases. Moreover, for their maintenance, these processing systems periodically require the implementation of specific alternate modes of combustion.

On the other hand, so as to respect the thresholds of polluting emissions imposed by current standards, it is advisable to control the quantities of partially recirculated gases and the quantities of fresh air admitted into the engine whatever the current mode of combustion of the engine. These modes of combustion can, for example, be a normal mode of combustion, a mode of combustion specific to the regeneration of the particulate filter or a mode of combustion specific to purging the nitrogen oxides trap. It is important, therefore, to control the quantities of partially recirculated gases and the quantities of fresh air admitted into the engine during the different modes of combustion used to ensure the maintenance of the exhaust gas treatment systems such as the particulate filter and the nitrogen oxides trap. Moreover, it appears necessary to manage the transition phases from one mode of combustion to the other for total control of the flow rates of air admitted and of the partially recirculated exhaust gases, and for guaranteeing a good driving experience in the vehicle. This periodic implementation of the specific alternate maintenance phases can, in fact, impair the quality of the driving experience, the fuel consumption and the management of polluting emissions.

There are methods that exist for controlling the flow rates of air and of partially recirculated gases that utilize control structures to regulate said flow rates. For example, reference can be made to French patent application FR 2 886 339, filed in the name of the applicant, which describes a structure called "rich mixture control structure" used to regulate the flow rate of air and the flow rate of partially recirculated gases in rich mixture, that is to say when the ratio between the fuel mass and the oxidant mass used by the engine during combustion is close to 1. However, this rich mixture control structure requires the use of two flow rate regulators that have to be calibrated in terms of the different modes of combustion in progress, which takes a lot of time to develop. Reference can be made to international patent application WO 2007/063258, also filed by the applicant, which describes a structure called "lean mixture control structure" used to regulate the flow rate of air or the flow rate of partially recirculated gases in lean mixture, that is to say when the ratio between the fuel mass and the oxidant mass used by the engine during combustion is less than 1. However, this lean mixture control structure utilizes just one regulator; it is not therefore adapted for a rich mixture control structure which requires the flow rates of air and of partially recirculated gases to be regulated simultaneously.

However, the rich mixture control structure is adapted for a mode of combustion during the purging of the nitrogen oxides trap and the lean mixture control structure is sufficient for a mode of combustion during the regenerating of the particulate filter. On the other hand, these maintenance phases require the exhaust gases to be at a high temperature. So as to keep the exhaust gases at a high temperature, it is judicious to alternate these two modes of combustion. Indeed, the fact of returning to a normal mode of combustion between regenerating the particulate filter and purging a nitrogen oxides trap can lead to loss of the high temperature gain acquired for the following hot mode.

It is possible to quote documents describing interest in controlling this change-over between combustion modes during regeneration of the particulate filter and purging the nitrogen oxides trap. For example, it is possible to quote American patent application US 2003/0110760 which describes a torque management method during transitions between phases for purging a nitrogen oxides trap and regenerating a particulate filter. However, the management of the air flow rate is established by means of an air flow rate set point calculated from the engine torque and there are no details as to how to control the air flow rate during transitions between the modes of combustion. It is also possible to quote British patent application GB 2 408 003 which describes a means for controlling the phases for purging a nitrogen oxides trap and for regenerating a particulate filter triggered from the estimation of mass of sulfur oxides and particulates present in the exhaust. However, this document does not disclose any means for managing the air flow rate during phase transitions. Moreover, other documents describe means for triggering the change-over between phases for purging a nitrogen oxides trap and regenerating a particulate filter with different criteria, such as, for example, European patent application EP 1 510 671, which utilizes estimation of the mass of sulfur oxides and particulates present in the exhaust, American patent application US 2006/0070373 and international patent application WO 00/32911 which utilize the temperature within the nitrogen oxides trap, European patent applications EP 1 538 311 and EP 1 102 920 which utilize the quantities of particulates and sulfur stored in the exhaust and international patent application WO 2005/073525 which utilizes a lambda factor for excess air in the particulate filter. However, these documents do not describe how to control the air flow rate during transitions between phases for purging the nitrogen oxides trap and regenerating the particulate filter.

BRIEF SUMMARY

There is therefore a need for a system to manage the transitions between the different modes of combustion, that is to say a system to control the flow rates of air and of partially recirculated gases during transitions between the use of a rich mixture control structure and the use of a lean mixture control structure.

Another requirement is to provide a fail-safe mode in the event of a system malfunction, to make up for any possible system failures and to ensure greater control of the flow rates of air and of partially recirculated gases.

In one embodiment, a system for controlling a power train with internal combustion for a motor vehicle provided with an electronic control unit includes an internal combustion engine, an exhaust gases partial recirculation loop provided with a recirculation valve controlled by means of a first actuator, and connected to a fresh air supply pipe of the engine provided with an air intake flap controlled by means of a second actuator. Means for determining the flow rate of fresh air and the flow rate of partially recirculated gases are also provided.

The electronic control unit includes:
  a first means for controlling said actuators, according to a rich mixture control structure, comprising two regulators for controlling respectively the position of the air intake flap and the position of the recirculation valve to position set point values;
  a second means for controlling said actuators, according to a lean mixture control structure, comprising one regulator for controlling the position of the air intake flap or the position of the recirculation valve to a position set point value; and
  a selecting means for activating the one or the other of said control means.

The rich mixture control structure is capable of controlling the actuators to set point positions equal to the set point positions of said actuators of the lean mixture control structure during a transition from a rich mixture control structure to a lean mixture control structure.

Thanks to this control system, it is possible to move from a control structure that includes two regulators to a structure that includes just one regulator, always ensuring continuity of position of the equipment controlled by the actuators and therefore, consequently, control of the air flow rate during transitions between modes of combustion. On the other hand, this avoids any jerking resulting from moving from one structure to the other, ensuring a more comfortable driving experience.

According to another embodiment, the power train includes a nitrogen oxides trap placed on the exhaust gases line. Selection of the rich mixture control structure is effected in an instantaneous manner during a transition from a lean mixture control structure to a rich mixture control structure in order to purge said nitrogen oxides trap.

According to another embodiment, the power train includes a particulate filter placed on the exhaust gases line. The rich mixture control structure controls the recirculation valve to a closed position during a transition from a rich mixture control structure to a lean mixture control structure in order to regenerate said particulate filter.

According to another embodiment, the rich mixture control structure controls the air intake flap to an open position during a transition from a rich mixture control structure to a lean mixture control structure for a normal mode of combustion.

According to another embodiment, the control system includes a means for detecting a malfunction of at least one means for determining the fresh air flow rate and/or the partially recirculated gases flow rate and for controlling the opening of the air intake flap and the closing of the recirculation valve during a transition to a lean mixture control structure.

According to another aspect, there is proposed a method for controlling a power train of a motor vehicle with exhaust gases partial recirculation, in which the fresh air flow rate and the partially recirculated gases flow rate are regulated, either according to a rich mixture control structure or according to a lean mixture control structure. Moreover, the flow rates are regulated, according to the rich mixture control structure, to set point values equal to the flow rate set point values of the lean mixture control structure during a transition from a rich mixture control structure to a lean mixture control structure.

According to another mode of implementation, a method is proposed, for an engine provided with a nitrogen oxides trap, in which the rich mixture control structure is selected in an instantaneous manner during a transition from a lean mixture control structure to a rich mixture control structure in order to purge the nitrogen oxides trap.

According to another mode of implementation, a method is proposed, for an engine provided with a particulate filter, in which the partially recirculated gases flow rate is regulated, according to the rich mixture control structure, until the partial recirculation of the exhaust gases is stopped during a transition from a rich mixture control structure to a lean mixture control structure in order to regenerate the particulate filter.

According to another mode of implementation, the fresh air flow rate is regulated, according to the rich mixture control structure, to a fresh air flow rate set point during a transition from a rich mixture control structure to a lean mixture control structure for a normal mode of combustion.

According to another mode of implementation, in the event of malfunction of at least one means for determining the fresh air flow rate and/or the partially recirculated gases flow rate, the instruction is given to stop the partial recirculation of the exhaust gases and a fresh air flow rate, according to the one or the other of said structures during a transition to a lean mixture control structure.

BRIEF DESCRIPTION OF THE DRAWINGS

Other aims, characteristics and advantages will appear on reading the following description, given purely by way of a non-limiting example, and provided with reference to the attached drawings, in which:

FIG. 5 shows a mode of combustion with a high rate of partially recirculated gases;

FIGS. 6 and 7 are overview diagrams of the means for regulating the air flow rate and means for regulating the partially recirculated gases flow rate;

DETAILED DESCRIPTION

Figure 1:
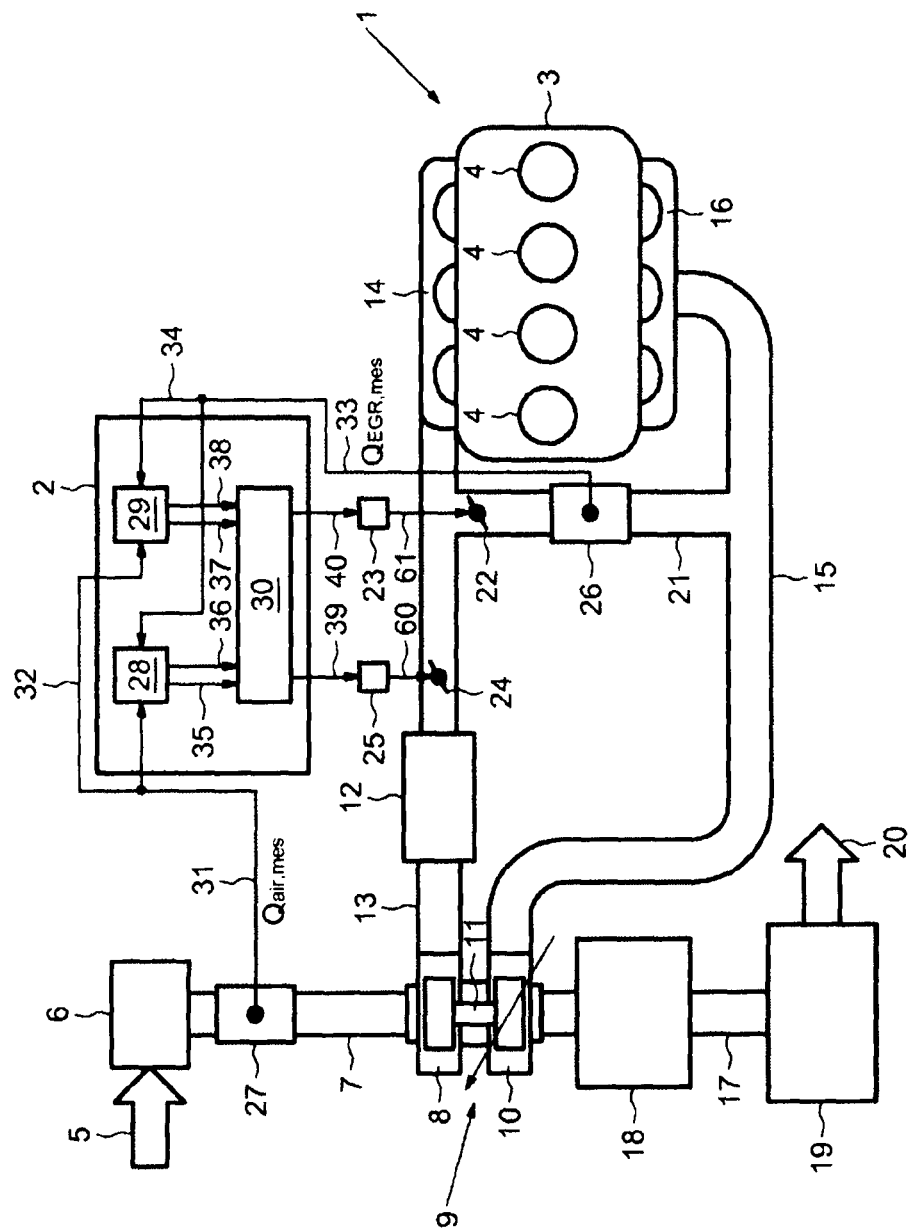
FIG. 1 is an overview diagram of a system for controlling a power train.

FIG. 1 shows a power train 1 and an electronic control unit 2. The power train 1 includes an internal combustion engine 3 comprising four cylinders 4.

In the example shown, the fresh air admitted 5 passes through an air filter 6 mounted in an air intake pipe 7. The air is compressed in a compressor 8 of a turbo-charger unit 9 that includes said compressor 8 and a turbo-expander 10 mounted on the same mechanical drive shaft 11 as the compressor 8, such that the turbo unit can drive the compressor 8 in rotation. The compressed air reheated by the compression is cooled by a cooling unit 12 mounted in a fresh air supply pipe 13 which brings the compressed air to the intake manifold 14 of the engine 3.

An exhaust pipe 15 brings the exhaust gases in an exhaust manifold 16 from the engine 3 to the turbo unit 10. The exhaust gases emitted from the turbo unit 10 and expanded are then evacuated by an exhaust line 17 in which are mounted a nitrogen oxides trap 18 and a particulate filter 19. An exhaust 20 expels the exhaust gases of the engine 3 into the atmosphere.

A recirculation loop 21 allows part of the exhaust gases of the engine 3 to recirculate, from the exhaust pipe 15 to the fresh air supply pipe 13. The recirculation loop 21 is provided with a recirculation valve 22, or EGR valve, which allows the quantity of partially recirculated exhaust gases to be modified and is controlled by means of a first actuator 23. The fresh air supply pipe 13 includes an intake air flap 24 which allows the quantity of fresh air supplying the engine 3 to be modified and is controlled by means of a second actuator 25. The air intake flap 24 is situated upstream of the connection between the recirculation loop 21 and the fresh air supply pipe 13.

The recirculation loop 21 is also provided with a flow meter 26, which allows the flow rate $Q_{EGR,mes}$ of the partially recirculated exhaust gases in said recirculation loop 21 to be measured. The air intake pipe 7 also includes a flow meter 27, which allows the flow rate $Q_{air,mes}$ of the fresh air supply of the engine 3 to be measured.

The electronic control unit 2 includes a rich mixture control structure 28 and a lean mixture control structure 29. The rich mixture control structure designates a control structure based on models that allow the EGR valve 22 and the air intake flap 24 to be controlled, respectively by means of the first actuator and the second actuator 25, in parallel, which is necessary for a rich mixture control structure. The lean mixture control structure designates a control structure that allows the fresh air flow rate of the engine 3 to be regulated through control by the EGR valve 22, by means of the first actuator 23, or the air intake flap 24, by means of the second actuator 25, which is sufficient for lean mixture combustion modes. The electronic control unit also includes a selection module 30, or coordinator, to activate the rich mixture control structure 28 by selecting said rich structure or to activate the lean mixture control structure 29 by selecting said lean structure. The control structures 28 and 29 include regulators for controlling the positions of the EGR valve 22 and of the air intake flap 24 respectively from, among other things, the measurements of the flow rate $Q_{EGR,mes}$ of the partially recirculated exhaust gases and of the flow rate $Q_{air,mes}$ of the fresh air supply of the engine 3.

The flow meter 27 transmits, through a connection 31, the air flow rate $Q_{air,mes}$ to the rich mixture control structure 28 and, through a connection 32, the air flow rate $Q_{air,mes}$ to the lean mixture control structure 29. The flow meter 26 transmits, through a connection 33, the flow rate of partially recirculated gases $Q_{EGR,mes}$ to the rich mixture control structure 28 and, through a connection 34, the flow rate $Q_{EGR,mes}$ to the lean mixture control structure 29.

In another embodiment, the system can be provided with a position sensor for the EGR valve 22 and a position sensor for the air intake flap 24, not represented in the figure, so as to measure the position of the valve and of the flap 24. As a variant, it could be possible to utilize the positions of the EGR valve 22 and of the air intake flap 24 to control the positions of said units, and, consequently, to utilize a position sensor for the EGR valve 22 in place of the flow meter 26 and a position sensor for the air intake flap 24 in place of the flow meter 27. Thus, it is possible to control the positions of the air intake flap 24 and of the EGR valve 22 from the positions measured by said position sensors and position set point values.

The rich mixture control structure 28 includes a first regulator to work out a position set point % Flap_R, transmitted by the connection 35 to the coordinator 30 and intended for the actuator 25 that controls the position of the air intake flap 24.

The rich mixture control structure 28 includes a second regulator to work out a position set point % Valve_R, transmitted by the connection 36 to the coordinator 30 and intended for the actuator 23 that controls the position of the EGR valve 22.

The lean mixture control structure includes a regulator to work out a position set point for the coordinator 30, either a position set point % Flap_P transmitted by the connection 37 and intended for the actuator 25 or a position set point % Valve_P transmitted by the connection 38 and intended for the actuator 23.

The position set points are therefore:
% Flap_R: position set point of the air intake flap 24 exiting from the rich mixture structure 28.
% Valve_R: position set point of the EGR valve 22 exiting from the rich mixture structure 28.
% Flap_P: position set point of the air intake flap 24 exiting from the lean mixture structure 29.
% Valve_P: position set point of the EGR valve 22 exiting from the lean mixture structure 29.

The coordinator 30 transmits the position set points worked out by the control structures 28 and 29 either through the connection 39 to the actuator 25 of the air intake flap 24 or through the connection 40 to the actuator 23 of the EGR valve 22.

Figure 2:
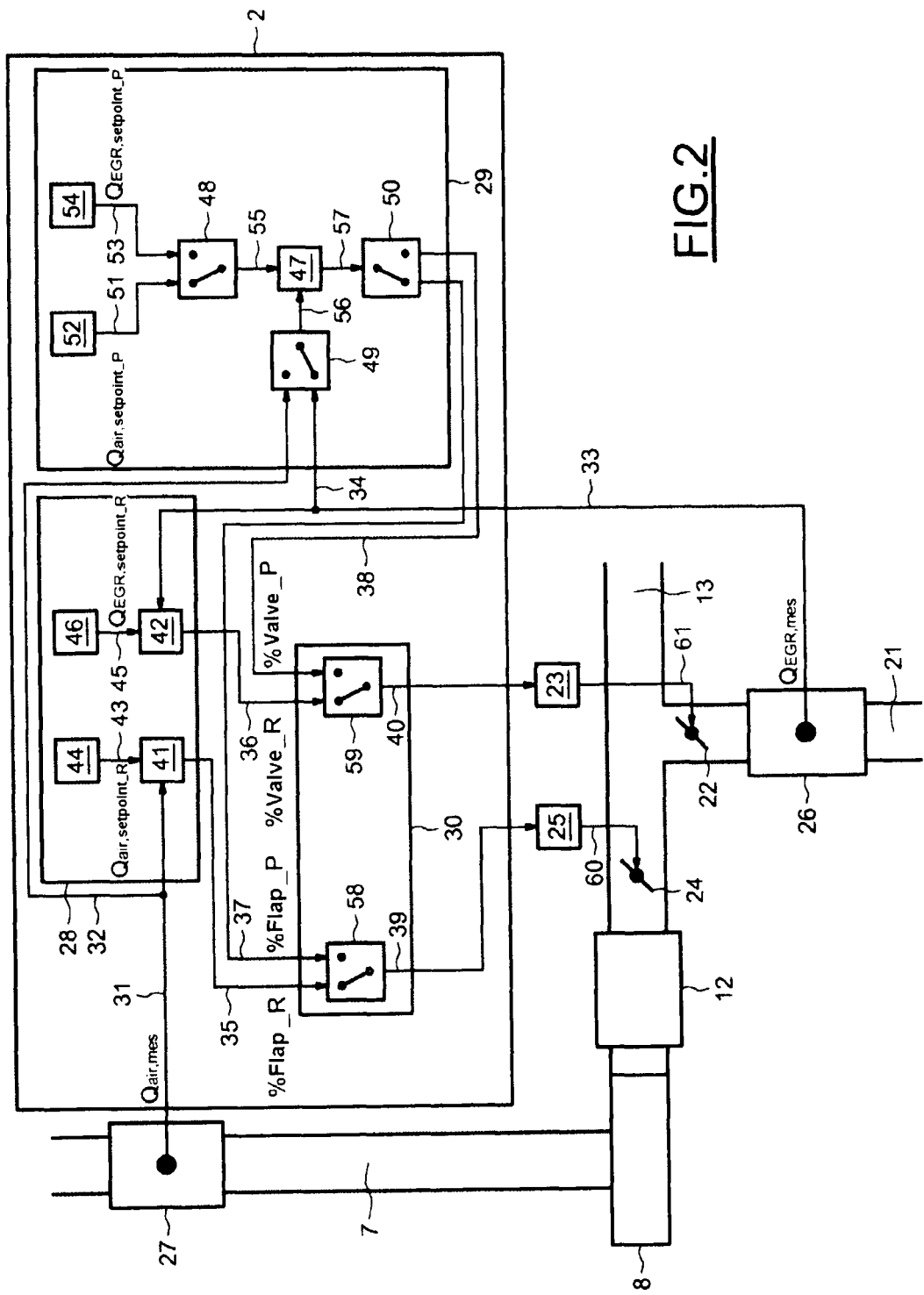
FIG. 2 is an overview diagram of a means for managing transitions between control structures.

The actuator 25 transmits the position control to the air intake flap 24 through the connection 60. The actuator 23 transmits the position control to the EGR valve 22 through the connection 61. FIG. 2 shows an overview diagram of a means for managing transitions between control structures. Certain elements described in FIG. 1 can also be found in the figure. Shown are the fresh air supply pipe 13 including the air intake flap 24 and its associated control actuator 25, the recirculation loop 21 including the EGR valve 22 and its associated control actuator 23, the flow meters 26 and 27 and the electronic control unit 2.

The rich mixture control structure 28 includes two regulators 41 and 42. These regulators allow the EGR valve 22 to be controlled, from, among other things, the measurement of the flow rate $Q_{EGR,mes}$ and from a set point value $Q_{EGR,setpoint\_R}$ and the air intake flap 24 from, among other things, the measurement of the flow rate $Q_{air,mes}$ and from a set point value $Q_{air,setpoint\_R}$. In another embodiment, the set point values $Q_{EGR,setpoint\_R}$ and $Q_{air,setpoint\_R}$ can be replaced by position set points. The first regulator 41 receives the measured air flow rate $Q_{air,mes}$ through the connection 31 and the set point value $Q_{air,setpoint\_R}$ through the connection 43 from a model 44 and delivers a position set point % Flap_R transmitted through the connection 35 to the coordinator 30. The second regulator 42 receives the flow rate of the partially recirculated gases $Q_{EGR,mes}$ through the connection 33 and the set point value $Q_{EGR,setpoint\_R}$ through the connection 45 from a model 46 and delivers a position set point % Valve_R transmitted through the connection 36 to the coordinator 30.

The lean mixture control structure 29 includes a regulator 47 and three selectors 48, 49 and 50. The regulator 47 allows either the EGR valve 22 to be controlled from, among other things, the measurement of the flow rate $Q_{EGR,mes}$ and from a set point value $Q_{EGR,setpoint\_P}$ or the air intake flap 24 to be controlled from, among other things, the measurement of the flow rate $Q_{air,mes}$ and from a set point value $Q_{air,setpoint\_P}$. The selector 48 is a set point selector which receives the set point $Q_{air,setpoint\_P}$ through the connection 51 from a model 52 and the set point $Q_{EGR,setpoint\_P}$ through the connection 53 from the model 54. This set point selector 48 allows the set point selected to be transmitted through the connection 55 to the regulator 47. The selector 49 is a flow rate selector which receives the measurement of the flow rate $Q_{air,mes}$ through the connection 32 and the measurement of the flow rate $Q_{EGR,mes}$ through the connection 34. This flow rate selector allows the measurement of the flow rate selected to be transmitted through the connection 56 to the regulator 47. The regulator 47 receives a selected flow rate measurement $Q_{air,mes}$ or $Q_{EGR,mes}$ through the connection 56 and a selected set point value $Q_{air,setpoint\_P}$ or $Q_{EGR,setpoint\_P}$ through the connection 55 and delivers a position set point transmitted through the connection 57 to the control selector 50. The control selector 50 transmits the position set point delivered by the regulator 47 either to the actuator 25 of the air intake flap 24 or to the actuator 23 of the EGR valve 22. If the air intake flap 24 is to be controlled by the lean mixture control structure 29, the control selector 50 transmits through the connection 37 the position set point % Flap_P established by the regulator from, among other things, the measurement of the flow rate $Q_{air,mes}$ selected by the flow rate selector 49 and the set point value $Q_{air,setpoint\_P}$ selected by the set point selector 48. If the EGR valve 22 is to be controlled by the lean mixture control structure 29, the control selector 50 transmits through the connection 38 the position set point % Valve_P established by the regulator 47 from, among other things, the measurement of the flow rate $Q_{EGR,mes}$ selected by the flow rate selector 49 and from the set point value $Q_{EGR,setpoint\_P}$ selected by the set point selector 48.

The coordinator 30 allows transitions to be carried out between the rich mixture control structure 28 and the lean mixture control structure 29 by selecting either the one or the other. The coordinator includes two selectors 58 and 59. The flap selector 58 receives the position set point % Flap_R transmitted by the connection 35 from the rich structure 28 and the position set point % Flap_P transmitted by the connection 37 from the lean structure 29. On the other hand, the valve selector 59 receives the position set point % Valve_R transmitted through the connection 36 from the rich structure 28 and the position set point % Valve_P transmitted through the connection 38 from the lean structure 29. The flap selector 58 transmits the selected position set point through the connection 39 to the actuator 25 and the valve selector 59 transmits the selected position set point through the connection 40 to the actuator 23.

The actuator 25 transmits the position control to the air intake flap 24 through the connection 60. The actuator 23 transmits the position control to the EGR valve 22 through the connection 61.

Figure 4:
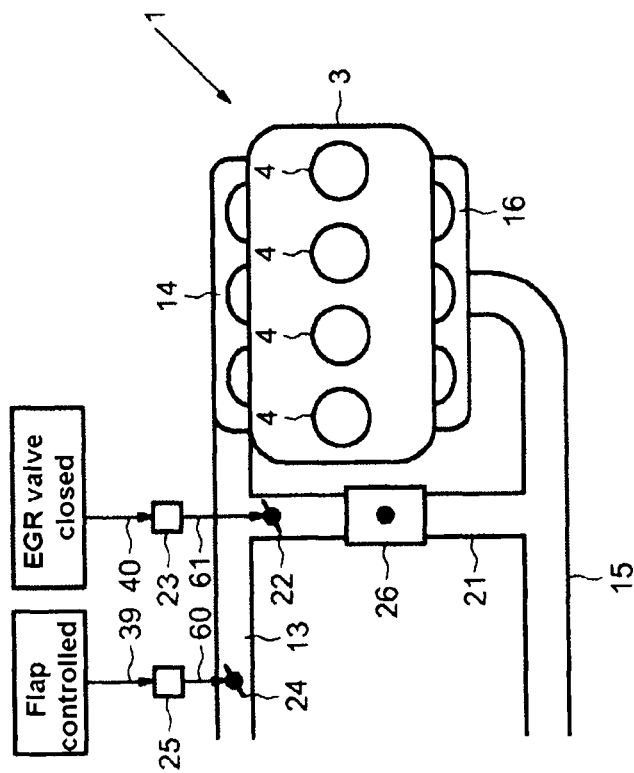
FIG. 4 shows a mode of combustion during regeneration of a particulate filter.
Figure 3:
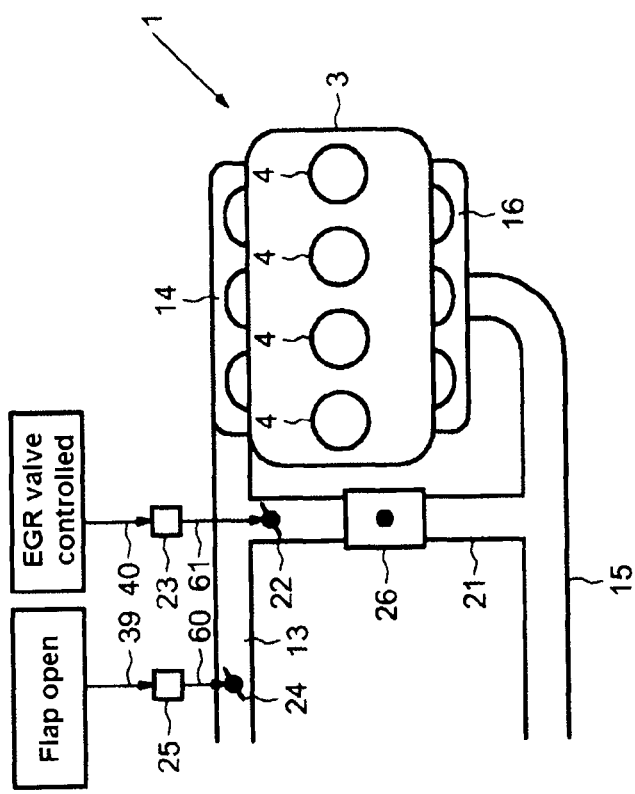
FIG. 3 shows a normal mode of combustion and a mode of combustion for a thermal catalytic converter.

FIGS. 3 to 5 show the regulation of the fresh air flow rate implemented by the lean mixture control structure 29 in the different modes of combustion in lean mixture. Shown are, as in FIG. 1, an engine 3, a fresh air supply pipe 13 including an air intake flap 24, a recirculation loop 21 including an EGR valve 22, an intake manifold 14 and an exhaust manifold 16.

The operation of the engine 3 in lean mixture includes four principal modes of combustion, a normal mode of combustion, a mode for regenerating the particulate filter 19, a mode of combustion with a high rate of partially recirculated gases and a combustion mode for a thermal catalytic converter mode. During these modes, it is sufficient to regulate the fresh air flow rate of the engine 3, therefore regulation will be established by the lean mixture control structure 29, in order to regulate said fresh air flow rate either by controlling the air intake flap 24 or by controlling the EGR valve 22. Indeed, regulation of the flow rate of the partially recirculated gases has a direct influence on the fresh air flow rate in accordance with the flow rates conservation law establishing that the flow rate admitted into the engine 3 is equal to the sum of the fresh air flow rate and the flow rate of the partially recirculated gases. FIG. 3 shows the management of the fresh air flow rate in the normal combustion mode. In the event of a normal combustion mode, the air intake flap 24 is open, and the lean mixture control structure 29 controls the EGR valve 22 by means of the regulator 47. FIG. 3 also shows the management of the fresh air flow rate in combustion mode for a thermal catalytic converter mode. The thermal catalytic converter mode corresponds to a mode for initializing the operation of the catalytic converter, not represented on the figure and which can be mounted on the exhaust line 17. Indeed, during the initializing phase the catalytic converter requires as rapid an increase in temperature as possible. Such a mode requires specific position set points for the air intake flap 24 and for the EGR valve 22 different from the normal mode of combustion. In the case of a mode of combustion for a thermal catalytic converter mode, the air intake flap 24 is guided in open loop, and the lean mixture control structure 29 controls the EGR valve 22 by means of the regulator 47. FIG. 4 shows the management of the fresh air flow rate in the mode for regenerating the particulate filter 19. In the case of a mode for regenerating the particulate filter 19, the air intake flap 24 is controlled by the lean mixture control structure 29 by means of the regulator 47, and the EGR valve 22 is in a closed position.

FIG. 5 shows the management of the fresh air flow rate in the combustion mode with a high rate of partially recirculated gases. In the event of a mode of combustion with a high rate of partially recirculated gases, the air intake flap 24 is controlled by the lean mixture control structure 29 by means of the regulator 47, and the EGR valve 22 is in the open position, saturated. The term "saturated" for the EGR valve or the air intake flap refers to a unit that can no longer follow the control set point and can no longer be controlled.

The purging of the nitrogen oxides trap is effected, in its turn, when the engine 3 is operating in rich mixture. During this phase, the positions of the EGR valve 22 and of the air intake flap 24 are regulated and controlled to the position set point values determined by the rich mixture control structure 28.

The transition from a lean mixture structure 29 to a rich mixture structure 28 is ensured by the rich mixture structure 28. During a transition from a lean mixture mode of combustion to a rich mixture mode of combustion, the coordinator 30 directly selects the rich mixture structure 28 through the selector 58, which selects the position set point % Flap_R, and through the selector 59 which selects the position set point % Valve_R. The rich mixture structure 28 instantaneously regulates the air intake flap 24 and the EGR valve 22. So as to ensure the continuity of the position of the EGR valve 22 and of the air intake flap 24, during this transition, the position set points of the rich mixture structure 28 are equal to those of the lean mixture structure 29.

The transition from a rich mixture structure 28 to a lean mixture structure 29 is also ensured by the rich mixture structure 28. During a transition from a rich mixture mode of combustion to a lean mixture mode of combustion, the rich mixture structure 28 controls the actuators 23 and 25 such that the air intake flap 24 and the EGR valve 22 are in the position adapted to the mode of combustion in lean mixture desired before the selection of the lean mixture structure 29.

In the event of malfunction of a means for determining the fresh air flow rate or the partially recirculated gases flow rate, a fail-safe mode is then implemented. This fail-safe mode of combustion corresponds to a mode where the EGR valve 22 is closed and the air intake flap 24 is open.

FIG. 6 shows an example of an embodiment of the regulator 41 of the fresh air flow rate of the rich mixture control structure. The regulator 41 includes two calculating modules 62 and 63, a subtractor 64, an integral proportional regulator or PI 65 and an adder 66.

The calculation module 62 allows a measurement $S_{cross\_flap,mes}$ of the cross section of the air intake flap to be determined from the measurement of the air flow rate $Q_{air,mes}$ and from other measurements originating from sensors, not represented on the figure, such as a measurement $P_{man,mes}$ of the pressure of the gases in the intake manifold 14, a measurement $P_{sural,mes}$ of the air pressure in the compressor 8 and a measurement $T_{sural,mes}$ of the air temperature downstream of the compressor 8. These measurements $Q_{air,mes}$, $P_{man,mes}$, $P_{sural,mes}$ and $T_{sural,mes}$ are received by the calculation module 62, respectively through the connections 31 and 67 to 69. The calculation of the measurement $S_{cross\_flap,mes}$ of the cross section of the air intake flap 24 is then transmitted through a connection 70 from the calculation module 62 to the subtractor 64.

The calculation module 63 allows a set point $S_{cross\_flap,setpoint\_R}$ of the cross section of the air intake flap 24 to be determined from the set point of the air flow rate $Q_{air,setpoint\_R}$ from another set point originating from a set point construction model, not represented on the figure, such as a set point $P_{man,setpoint\_R}$ of the pressure of the gases in the intake manifold 14, and among other things from the measurement $P_{sural,mes}$ of the air pressure in the compressor 8 and from the measurement $T_{sural,mes}$ of the air temperature downstream of the compressor 8. The set points $Q_{air,setpoint\_R}$ and $P_{man,setpoint\_R}$ are received by the calculation module 63 respectively through the connections 43 and 71, and the measurements $P_{sural,mes}$ and $T_{sural,mes}$ are received by the calculation module 63 respectively through the connections 72 and 73. The calculation of the set point $S_{cross\_flap,setpoint\_R}$ of the cross section of the air intake flap 24 is then transmitted through a connection 74 from the calculation module 63 to the subtractor 64.

The subtractor 64 subtracts the measurement $S_{cross\_flap,mes}$ of the cross section of the air intake flap 24, received through the connection 70, from the set point $S_{cross\_flap,setpoint\_R}$, received through the connection 74, and transmits the calculated difference $\Delta S_{cross\_flap}$ through the connection 75 to the integral proportional regulator 65. Said integral proportional regulator 65 processes the difference $\Delta S_{cross\_flap}$ transmitted by the subtractor 64 and supplies, through the connection 76, a control signal which will be added to the set point $S_{cross\_flap,setpoint\_R}$, received by the connection 77, by the adder 66 to establish a position control % Flap_R through the connection 35.

Figure 7:
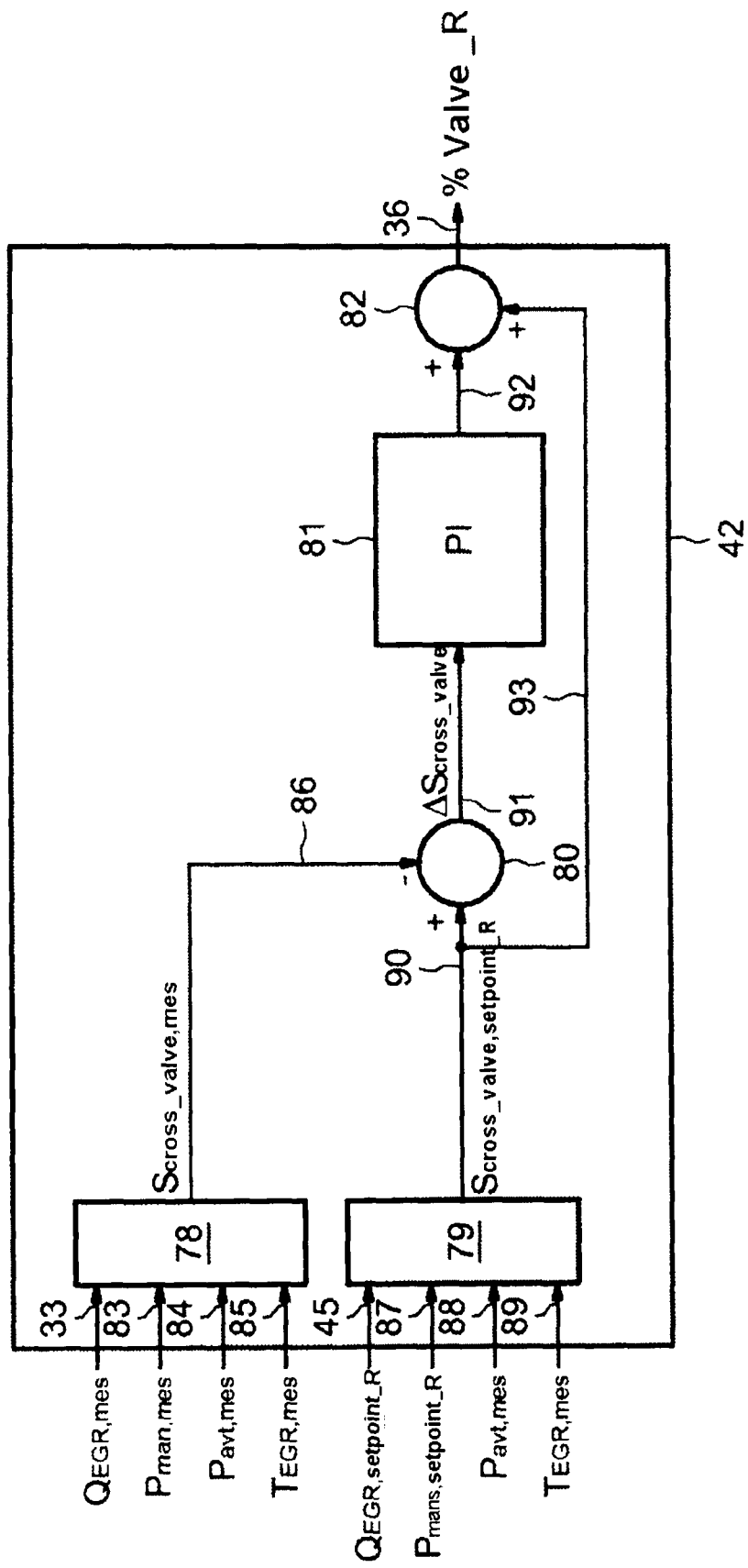

FIG. 7 shows an example of an embodiment of the regulator 42 for the partially recirculated gases of the rich mixture control structure. The regulator 42 includes two calculation modules 78 and 79, a subtractor 80, an integral proportional regulator or PI 81 and an adder 82.

The calculation module 78 allows a measurement $S_{cross\_valve,mes}$ of the cross section of the EGR valve 22 to be determined from a flow rate measurement $Q_{EGR,mes}$ and from other measurements originating from sensors, not represented in the figure, such as the measurement $P_{man,mes}$ of the pressure of the gases in the intake manifold 14, from a measurement $P_{avt,mes}$ Of the pressure of the exhaust gases in the exhaust pipe 15 and from a measurement $T_{EGR,mes}$ of the temperature of the partially recirculated exhaust gases in the recirculation loop 21. These measurements $Q_{EGR,mes}$ $P_{man,mes}$ $P_{avt,mes}$ and $T_{EGR,mes}$ are received by the calculation module 78 respectively through the connections 33 and 83 to 85. As a variant, the measurement $Q_{EGR,mes}$ could be replaced by an estimation of the flow rate $Q_{EGR,est}$ of the partially recirculated exhaust gases, constructed by an estimation model not shown in the figure. The calculation of the measurement $S_{cross\_valve,mes}$ of the cross section of the EGR valve 22 is then transmitted through a connection 86 from the calculation module 78 to the subtractor 80.

The calculation module 79 allows a set point $S_{cross\_valve,setpoint\_R}$ of the cross section of the EGR valve to be determined from the flow rate set point $Q_{EGR,setpoint\_R}$, from the set point $P_{man,setpoint\_R}$ of the pressure of the gases in the intake manifold 14, from the measurement $P_{avt,mes}$ of the pressure of the exhaust gases in the exhaust pipe 15 and from the measurement $T_{EGR,mes}$ of the temperature of the partially recirculated exhaust gases in the recirculation loop 21. The set points $Q_{EGR,setpoint\_R}$ and $P_{man,setpoint\_R}$ are received by the calculation module 79 respectively through the connections 45 and 87. The measurements $P_{avt,mes}$ and $T_{EGR,mes}$ are received by the calculation module 79 respectively through the connections 88 and 89. The calculation of the set point $S_{cross\_valve,setpoint\_R}$ of the cross section of the EGR valve 22 is then transmitted through a connection 90 from the calculation module 79 to the subtractor 80.

The subtractor 80 subtracts the measurement $S_{cross\_valve,mes}$ of the cross section of the EGR valve 22, received by the connection 86, from the set point $S_{cross\_valve,setpoint\_R}$, received by the connection 90, and transmits the calculated difference $\Delta S_{cross\_valve}$ through the connection to the integral proportional regulator 81. Said integral proportional regulator 81 processes the difference $\Delta S_{cross\_valve}$ transmitted by the subtractor 80 and supplies, through the connection 92, a control signal which will be added to the set point $\Delta S_{cross\_valve}$, received by the connection 93, by the adder 82 to establish a position control % Valve_R through the connection 36.

On the other hand, the regulator 47 of the lean mixture control structure 29 can be realized in a manner similar to those previously described in FIGS. 6 and 7.

Figure 8:
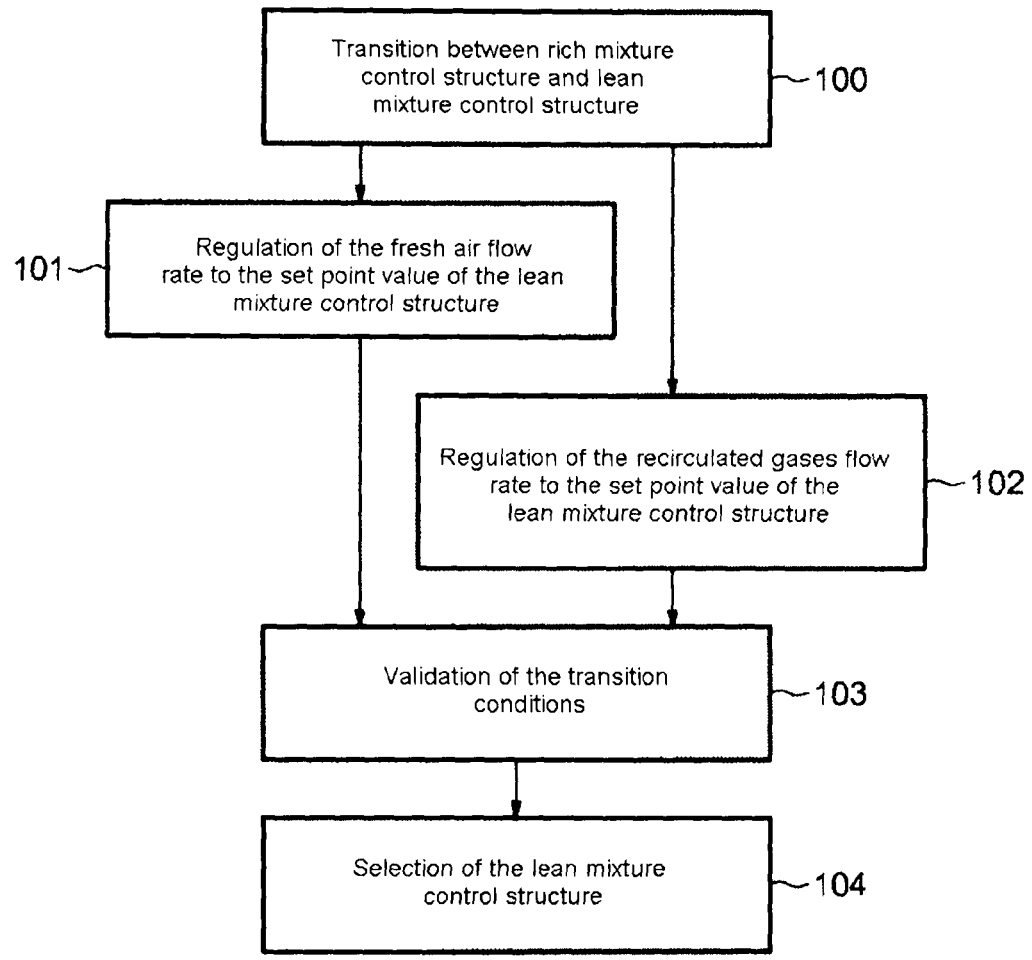
FIG. 8 is a flowchart showing the principal phases of the method for managing a transition to a lean mixture control structure.
Figure 9:
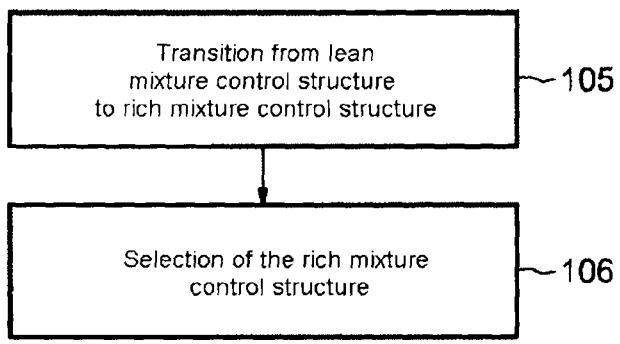
FIG. 9 is a flowchart showing the principal phases of the method for managing a transition to a rich mixture control structure.

FIGS. 8 and 9 show two flowcharts illustrating the principal phases of the method for managing transitions between modes of combustion. This method can be implemented by the system that has just been described. This method can be implemented in the electronic control unit 2 provided on board the vehicle. The transitions are triggered by a supervisor that is situated upstream of the rich mixture 28 and lean mixture 29 control structures previously described and can also be implemented in the electronic control unit 2.

FIG. 8 shows a flowchart illustrating the principal phases of the method during a transition to a lean mixture control structure 29. The stage 100 corresponds to a decision, taken by the supervisor, to move from a rich mixture mode of combustion to one of the lean mixture modes of combustion. This stage 100 is followed by two stages 101 and 102 for regulating the fresh air flow rate and the partially recirculated gases flow rate which are both carried out in parallel. The stage 101 corresponding to regulation of the fresh air flow rate to a flow rate set point value (or a position set point value of the air intake flap 24) of the lean mixture control structure 29 to be selected. The stage 102 corresponding to regulation of the partially recirculated gases flow rate to a flow rate set point value (or a position set point value of the EGR valve 22) of the lean mixture control structure 29 to be selected. A validation stage 103 consists of validating the conditions of transition. This stage can consist of validating the end of a delay time, either the "open" position of the air intake flap 24 during a transition to the normal mode of combustion, or the "closed" position of the EGR valve 22 during a transition to the specific mode of combustion for regenerating the particulate filter 19. This validation stage 103 is then followed by a stage 104 for selecting the lean mixture control structure 29.

FIG. 9 shows a flowchart illustrating the principal phases of the method during a transition to a rich mixture control structure 28. The stage 105 corresponds to a decision, taken by the supervisor, to move from a lean mixture mode of combustion to a rich mixture mode of combustion. This stage 105 is directly followed by a stage 106 for selecting the rich mixture control structure 28.

The invention claimed is:

1. A system for controlling a power train with internal combustion for a motor vehicle provided with an electronic control unit, said system comprising:
an internal combustion engine;
an exhaust gases partial recirculation loop provided with a recirculation valve controlled by a first actuator, and connected to a fresh air supply pipe of the engine provided with an air intake flap controlled by a second actuator, and determining unit for determining fresh air flow rate and partially recirculated exhaust gases flow rate, the electronic control unit comprising:
a first unit that controls said actuators when the engine is provided with a rich mixture of fuel mass to oxidant mass, according to a rich mixture control structure, comprising two regulators for controlling respectively a position of the air intake flap and a position of the recirculation valve to position set point values;
a second unit that controls said actuators when the engine is provided with a lean mixture of fuel mass to oxidant mass, according to a lean mixture control structure, comprising a regulator for controlling the position of the air intake flap or the position of the recirculation valve to a position set point value; and
a selecting unit that activates the first or second unit,
wherein the rich mixture control structure is configured to control the first and second actuators to position set point values equal to initial position set point values of said actuators of the lean mixture control structure during a transition from the rich mixture control structure to the lean mixture control structure and before the lean mixture control structure controls the first actuator or the second actuator.

2. The system as claimed in claim 1, in which the power train comprises a nitrogen oxides trap placed on the exhaust gases line and in which the selection of the rich mixture control structure is effected in an instantaneous manner during a transition from a lean mixture control structure to a rich mixture control structure in order to purge said nitrogen oxides trap.

3. The system as claimed in claim 1, in which the power train comprises a particulate filter placed on the exhaust gases line and in which the rich mixture control structure controls the recirculation valve to a closed position during a transition from a rich mixture control structure to a lean mixture control structure in order to regenerate said particulate filter.

4. The system as claimed in claim 1, in which the rich mixture control structure controls the air intake flap to an open position during a transition from a rich mixture control structure to a lean mixture control structure for a normal mode of combustion.

5. The system as claimed in claim 1, comprising a detection unit for detecting a malfunction of at least one determining unit for determining at least the fresh air flow rate or the partially recirculated gases flow rate and for controlling the opening of the air intake flap and the closing of the recirculation valve during a transition to the lean mixture control structure.

6. A method for controlling a power train of a motor vehicle with partial exhaust gases recirculation, the method comprising
regulating a fresh air flow rate by controlling a position of an air intake flap and a partially recirculated gases flow rate by controlling a position of a recirculation valve according to a rich mixture control structure when the engine is provided with a rich mixture of fuel mass to oxidant mass; and
regulating the fresh air flow rate by controlling the position of the air intake flap or the partially recirculated gases flow rate by controlling the position of the recirculation valve according to a lean mixture control structure when the engine is provided with a lean mixture of fuel mass to oxidant mass,
wherein the flow rates are regulated, according to the rich mixture control structure, to position set point values equal to initial position set points of the lean mixture control structure during a transition from the rich mixture control structure to the lean mixture control structure and before the lean mixture control structure regulates the flow rates.

7. The method as claimed in claim 6, for an engine provided with at least a nitrogen oxides trap or a sulfur oxides trap, in which the rich mixture control structure is selected in an instantaneous manner during a transition from the lean mixture control structure to the rich mixture control structure in order to purge the nitrogen oxides trap and/or the sulfur oxides trap.

8. The method as claimed in claim 6, for an engine provided with a particulate filter, in which the partially recirculated gases flow rate is regulated, according to the rich mixture control structure, until the partial recirculation of the exhaust gases is stopped during a transition from the rich mixture control structure to the lean mixture control structure in order to regenerate the particulate filter.

9. The method as claimed in claim 6, in which the fresh air flow rate is regulated, according to the rich mixture control structure, to a fresh air flow rate set point during a transition from the rich mixture control structure to the lean mixture control structure for a normal mode of combustion.

10. The method as claimed in claim 6, in which, in the event of malfunction of at least one means for determining at least the fresh air flow rate or the partially recirculated exhaust gases flow rate, the instruction is given to stop partial recirculation of exhaust gases and the fresh air flow rate, according to the one or the other of said structures during a transition to the lean mixture control structure.

11. The system as claimed in claim 1, wherein
the rich mixture control structure controls both the position of the air intake flap and the position of the recirculation valve at the same time to the position set point values when the engine is provided with the rich mixture, and
the lean mixture control structure controls only one of the position of the air intake flap or the position of the recirculation valve at the same time to the position set point value when the engine is provided with the lean mixture.

12. The method as claimed in claim 6, wherein
the rich mixture control structure controls both the position of the air intake flap and the position of the recirculation valve at the same time when the engine is provided with the rich mixture, and
the lean mixture control structure controls only one of the position of the air intake flap or the position of the recirculation valve at the same time when the engine is provided with the lean mixture.

* * * * *